(12) United States Patent
Harley et al.

(10) Patent No.: US 6,239,889 B1
(45) Date of Patent: May 29, 2001

(54) OPTICAL SIGNAL POWER DETECTION WITH SIGNATURE BIT PATTERN IN WDM SYSTEMS

(75) Inventors: James Harley; Richard A. Habel, both of Ottawa (CA)

(73) Assignee: Nortel Networks Limited, Montreal (CA)

(*) Notice: Subject to any disclaimer, the term of this patent is extended or adjusted under 35 U.S.C. 154(b) by 0 days.

(21) Appl. No.: 08/986,027

(22) Filed: Dec. 5, 1997

(30) Foreign Application Priority Data

Oct. 22, 1997 (CA) .................................. 2218951

(51) Int. Cl.[7] .......................... H04B 10/00; H04B 10/08
(52) U.S. Cl. ................................. 359/124; 359/110
(58) Field of Search ................................. 359/110, 177, 359/161, 180, 187, 133

(56) References Cited

U.S. PATENT DOCUMENTS

| | | | | |
|---|---|---|---|---|
| 5,513,029 | * | 4/1996 | Roberts | 359/177 |
| 5,654,816 | * | 8/1997 | Fishman | 359/177 |
| 5,699,081 | * | 12/1997 | Denkin et al. | 359/341 |
| 6,043,915 | * | 3/2000 | Giles et al. | 359/132 |
| 6,111,676 | * | 8/2000 | Lemus | 359/124 |

FOREIGN PATENT DOCUMENTS

| | | |
|---|---|---|
| 54-105404 | 8/1979 | (JP) . |
| 62-139150 | 8/1987 | (JP) . |
| 63-85934 | 6/1988 | (JP) . |
| 63-203027 | 8/1988 | (JP) . |
| 4-66835 | 6/1992 | (JP) . |
| 9224016 | 8/1997 | (JP) . |

\* cited by examiner

*Primary Examiner*—Jason Chan
*Assistant Examiner*—Agustin Bello
(74) *Attorney, Agent, or Firm*—Aprilia U. Diaconescu

(57) ABSTRACT

The power of an optical signal ($s_1$) travelling on a channel ($\lambda_1$) of a WDM transmission system, is measured using a signature bit pattern ($s_{BP1}$) which is inserted in the frame of the optical signal ($s_1$). The power level of $s_{BPL}$ is adjusted at the launching point to a predetermined ratio (m) with the power of the optical signal. At a point of interest, the fiber is tapped and a fraction of the tapped signal, that includes a corresponding fraction of $s_{BP1}$, is converted to an electrical signal. The fraction of $s_{BP1}$ is extracted from a the electrical signal and power of $s_{BPL}$ is measured. This gives the optical power of $s_1$ as (m) is known and also the calibration constant for the respective channel ($\lambda_1$) is known. The method can be applied for any and all channels of the WDM transmission system.

16 Claims, 1 Drawing Sheet

OPTICAL SIGNAL POWER DETECTION WITH SIGNATURE BIT PATTERN IN WDM SYSTEMS

BACKGROUND OF THE INVENTION

1. Field of the Invention

This invention is directed to a method for monitoring the performance of optical WDM systems and in particular to an optical signal power detection method using a signature bit pattern.

2. Background Art

In optical transmission systems, various parameters such as power are measured to obtain information on the operating conditions of the transmission link. The fiber optic cables are tested by measuring the power losses associated with the light transmission, and thus, determine potential transmission errors.

In a WDM system, because different wavelengths of light have different attenuation characteristics, it is important to determine the attenuation of the fiber optic cable with respect to a specific wavelength of light used for a particular transmission channel. It is important to detect accurately the optical power of individual optical signals for many reasons, such as improved control of optical amplifiers, signal tracking at the optical layer, monitoring the accumulation of optical noise in a link with cascaded amplifiers, etc.

It is known to monitor the input and output of an optical amplifier in order to control the gain. To this end, fractions of the input and output signals are coupled out by taps (couplers) and detected by photodiodes. The electrical signals, recovered after this detection, are then used by the power monitor as needed. Since the power of the coupled out signal is very low in the case of digital systems, the power monitors required to detect and process this low signal are rather complex.

To date, the only other method for detecting the optical power of signals without using expensive optical filters is to amplitude modulate the optical signal to a controlled modulation depth with a signal (dither) unique to the respective transmission system. This method, disclosed in U.S. Pat. No. 5,513,029 by Kim Roberts, issued on Apr. 30, 1996 and assigned to Northern Telecom Limited, requires additional optical components, such as an external modulator and optical attenuators, and also requires electronics and real time control software at the transmitter, to both apply the amplitude modulation and to detect it, in order to accurately control the modulation depth.

SUMMARY OF THE INVENTION

It is an object of the present invention to provide a method for detecting the optical power of a digital optical signal in the presence of other optical signals at different wavelengths, without using expensive fixed or tracking optical filters.

Accordingly, there is provided a method for measuring the power of an optical signal ($s_1$) travelling on a first channel ($\lambda_1$) of a WDM transmission system, comprising the steps of, generating a signature bit pattern ($s_{BP1}$), adjusting the power level of the signature bit pattern to a predetermined ratio (m) with the power of the optical signal, inserting the signature bit pattern ($s_{BP1}$) into the frame of the optical signal ($s_1$) and transmitting same along a span of transmission medium, measuring the power of the signature bit pattern ($s_{BP1}$) at a point of interest on the span, and determining the optical power of the optical signal ($s_1$) in the point of interest.

The advantage of this invention is that it provides a simple method for determining the optical power in a WDM system, whereby no additional electronics, expensive optical components and real time software are required at the transmitter side, resulting in considerable savings in circuit pack layout space, cost and development time.

BRIEF DESCRIPTION OF THE DRAWINGS

The foregoing and other objects, features and advantages of the invention will be apparent from the following more particular description of the preferred embodiment, as illustrated in the appended FIG. 1 which shows a block diagram of a WDM system according to the invention.

DESCRIPTION OF THE PREFERRED EMBODIMENT

Figure 1:
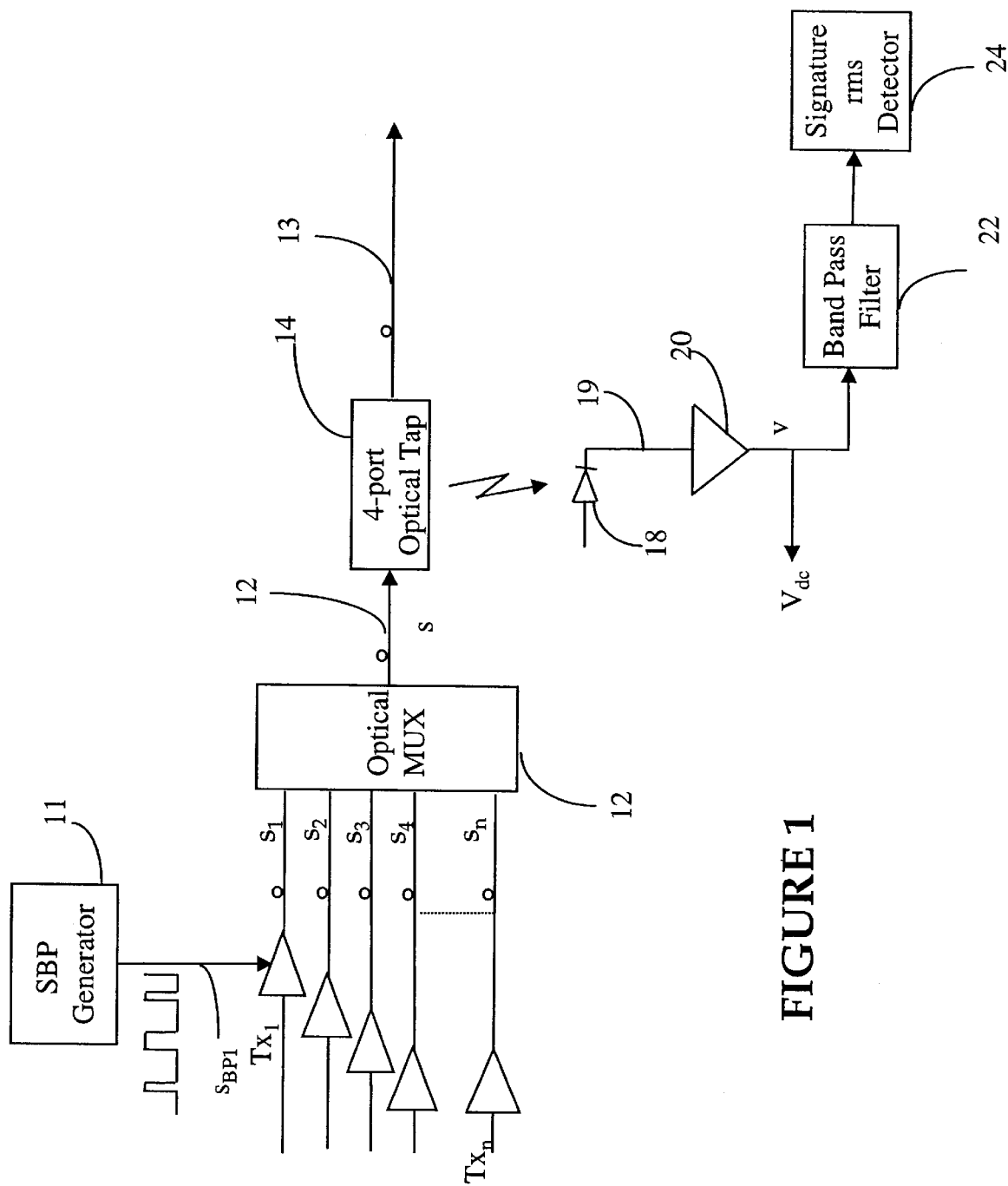

For this invention, a unique signature bit pattern is inserted in a digital optical signal, where the rms (root mean square) of the signature bit pattern has inherently a fixed ratio to the optical power. Detecting the rms of this signature bit pattern means the optical power of the optical signal can be determined. As well, the optical power of the optical signals co-propagating along the same fiber span may be detected at the same time, when each optical signal is given a unique signature pattern. The signature bit pattern for each co-propagating signal is designed to be detected independently from each other.

FIG. 1 shows a block diagram of a WDM system using the signature bit patterns according to the invention. The WDM system of FIG. 1 shows a plurality of optical signals $s_1$–$s_n$ propagating in the same direction. It is to be understood that the invention applies also to bidirectional optical WDM systems, such as for example to SONET/SDH 8-wavelength bidirectional systems.

Signals $s_1$–$s_n$ are multiplexed in an optical multiplexer 12 to obtain a multichannel signal s on fiber 11. A signature bit pattern, shown at $s_{BP1}$, generated by a SPB generator 11, is inserted into the frame of optical signal $s_1$. If we note the average optical power of $s_1$ with '$P_1$', the average optical power of $s_{BP1}$ with '$P_{BP1}$', and the ratio between the powers of $s_{BP1}$ and $s_1$ with 'm', we have the following relationship:

$$m = P_{BP1}/P_1 \text{ or, } P_{BP1} = m \times P_1 \tag{1}$$

As the signature bit pattern is inserted in the frame of the digital optical signal, ratio 'm' remains constant along the entire path. This is however true only if either the extinction ratio for the optical signal remains constant and known, or the extinction ratio is kept better than an acceptable amount.

The optical signal $s_1$ with the signature bit pattern is carried by channel $\lambda_1$ on fiber 11, together with signals $s_2$–$s_n$. A tap monitor at some point of interest in the WDM system, noted 14 on FIG. 1, taps fiber 11 and receives a fraction of signal s, which comprises a respective fraction of the optical signals $s_1$–$s_n$ for all channels $\lambda_1$–$\lambda_n$. The tapped fraction is converted to an electrical signal, shown by reference numeral 19, by PIN diode 16 and then amplified by transimpedance amplifier 18.

The electrical signal v at the output of transimpedance amplifier 18 comprises an ac and a dc component. The dc voltage $V_{dc}$ is a linear combination of the individual optical signal powers:

$$V_{dc} = a \times P_1 + b \times P_2 + c \times P_3 + \ldots n \times P_n \tag{2}$$

where a, b, . . . n are known calibration constants for the respective transmission channel, and $P_1$–$P_n$ are the optical powers of the respective optical signals $s_1$–$s_n$.

Signal v is filtered in a band pass filter 20 for extracting the frequencies of interest, which in this case are the component frequencies of the signature bit pattern $s_{BP1}$. A signature rms detector 22 detects the 'rms$_1$' of $s_{BP1}$ independent from the interferences from the co-propagating optical signals. The signature rms detector may be realized either with an analog filter with peak detect circuitry, or with a super Nyquist sampling A/D converter and a DSP chip to implement a digital matched filter detection.

At the frequencies of interest, the power of the signature bit patterns for the other channels $\lambda_2$ to $\lambda_n$ is practically zero, by design, so that the measured rms$_1$ gives $P_{BP1}$ using the relation:

$$P_{BP1} = rms_1/a \qquad (3)$$

where 'a' is the calibration constant for channel $\lambda_1$, known. The value of $P_1$ can now be determined knowing m, which gives:

$$P_1 = rms_1/m \times a \qquad (4)$$

In a similar way, if the other signals $s_2$–$s_n$ have their own unique signature pattern, or analog dither, the optical power of these signals can be determined in the same way, as long as all the signal dithers are designed to be independently detected from each other, for example they are frequency division multiplexed.

An example of an implementation of the invention is the application of the signature bit pattern of the invention to determining the power of the bidirectional service optical channel (Bi-OSC). Bi-OSC is a service channel that is transmitted and terminated at each optical amplifier. This channel has a signalling rate of 9.72 Mb/s in each direction and is Manchester encoded in order to reduce its interference in the analog maintenance bandwidth (40 kHz) to acceptable levels.

The wavelength of the channel for one direction of transmission is selected in the red band and for the reverse direction, in the blue band. The frame of the signal transmitted on this channel has 2430 bits, 96 bits being used for the signature. The average optical power of the Bi-OSC is also accounted for in order to make the average output control in the forward direction of transmission (i.e. the red band) and in the reverse direction of transmission (i.e. the blue band) more accurate by subtracting the power contribution from the respective OSC channels.

The signature bit pattern for the red channel is inserted on a frame by frame basis. After the Manchester encoding, the red OSC signature pattern is inserted in the following bit positions of the red OSC frame.

TABLE 1

Red OSC signature bit pattern

| Bit Position | Red OSC signature block |
|---|---|
| 1 | 1111 0011 1100 0110 |
| 401 | 0011 1100 1111 0110 |
| 801 | 0011 1100 1111 0110 |
| 1217 | 0000 1100 0011 1001 |
| 1617 | 1100 0011 0000 1001 |
| 2017 | 1100 0011 0000 1001 |

The spectrum of the red OSC signature bit pattern comprises odd multiples of 4 kHz, namely 4 kHz, 12 kHz, 20 kHz, etc. which makes it phase orthogonal to the AM dithers, SONET 8 kHz tones and the blue signature bit pattern.

The minimum hamming distance between the first block and the other blocks within the frame is 8.

The signature bit pattern for the blue channel is inserted on a two consecutive frame by two consecutive frame basis. After the Manchester encoding, the blue OSC signature pattern is inserted in the following bit positions.

TABLE 2

Blue OSC signature bit pattern

| Frame # | Bit Position | Blue-OSC signature block |
|---|---|---|
| First Frame | 1 | 1111 0011 1100 0110 |
| | 401 | 0011 1100 1111 0110 |
| | 801 | 0011 1100 1111 0110 |
| | 1217 | 1100 0011 0000 1001 |
| | 1617 | 1100 0011 0000 1001 |
| | 2017 | 1100 0011 0000 1001 |
| Second Frame | 1 | 0000 1100 0011 1001 |
| | 401 | 1100 0011 0000 1001 |
| | 801 | 1100 0011 0000 1001 |
| | 1217 | 0011 1100 1111 0110 |
| | 1617 | 0011 1100 1111 0110 |
| | 2017 | 0011 1100 1111 0110 |

The spectrum of the blue OSC signature bit pattern are odd multiples of 2 kHz, namely 2 kHz, 6 kHz, 10 kHz, etc. which makes it phase orthogonal to the AM dithers, SONET 8 kHz tones and the blue signature bit pattern.

The minimum hamming distance between the first block and the other blocks within the frame is 8.

While the invention has been described with reference to particular example embodiments, further modifications and improvements which will occur to those skilled in the art, may be made within the purview of the appended claims, without departing from the scope of the invention in its broader aspect.

We claim:

1. A method for measuring the power of an optical signal ($s_1$) travelling on a first channel ($\lambda_1$) of a WDM transmission system between a transmit terminal and a receive terminal, comprising the steps for:

at said transmit terminal, generating a signature bit pattern ($s_{BP1}$);

inserting said signature bit pattern ($s_{BP1}$) into the frame of said optical signal ($s_1$) and transmitting same along a span of a transmission medium;

at a point of interest along said span, measuring the power $P_{BP1}$ of said signature bit pattern ($s_{BP1}$); and determining the optical power $P_1$ of said optical signal ($s_1$) in said point of interest using the relationship $P_1 = P_{BP1}/m$, where m is a predetermined ratio.

2. A method as claimed in claim 1, wherein said signature bit pattern ($s_{BP1}$) is unique to said span.

3. A method as claimed in claim 1, wherein said step of inserting comprises providing the bits of said signature bit pattern ($s_{BP1}$) in predetermined positions of the frame of said optical signal ($s_1$) just before launching said signal on said span.

4. A method as claimed in claim 3, further comprising:

providing a plurality of optical signals ($s_i$), each for a respective transmission channel ($\lambda_i$), where i∈ [2, n]; and multiplexing said optical signal ($s_1$), comprising said signature bit pattern ($s_{BP1}$), with said optical signals ($s_i$) into a multichannel signal (s) and launching said multichannel signal (s) on said span.

5. A method as claimed in claim 4, wherein said step of measuring the power of said signature bit pattern ($s_{BP1}$) comprises:

taping a fraction of said multi-channel signal (s) in said point of interest;

converting said fraction into an electrical signal (v);

filtering said electrical signal (v) to pass a signature signal of a band comprising the frequency components of said signature bit pattern; and measuring the root mean square $rms_{SB1}$ value of said signature signal.

6. A method as claimed in claim 5, wherein said step of determining the optical power ($P_1$) of said optical signal ($s_1$) comprises applying said ratio (m) to said $rms_{SB1}$ value.

7. A method as claimed in claim 6, further comprising applying a correction factor (a) to said ($P_1$).

8. A method as claimed in claim 5, wherein measuring the root mean square $rms_{SB1}$ value of said signature signal is performed with an analog filter with peak detect circuitry.

9. A method as claimed in claim 5, wherein said step of measuring the root mean square $rms_{SB1}$ value of said signature signal comprises digital matched filter detection.

10. A method as claimed in claim 9, wherein said digital matched filter detection is performed with a super Nyquist sampling analog-to-digital converter and a digital signal processing unit.

11. A method as claimed in claim 4, wherein each of said optical signals ($s_i$) comprises a respective signature bit pattern ($s_{BPi}$) for detecting a respective optical power ($P_i$) of a respective optical signal ($s_i$) in said point of interest.

12. An apparatus for measuring the power of an optical signal $s_1$ travelling on a first channel $\lambda_1$ of a WDM transmission system between a transmit terminal and a receive terminal, comprising, at a transmit site a signature bit pattern generator for generating a signature bit pattern $s_{BP1}$ of a power level $P_{BP1}$ at a predetermined ratio m with the power $P_1$ of said optical signal; and an optical transmitter for inserting said $s_{BP1}$ into the frame of said $s_1$ and launching said $s_1$ with said $s_{BP1}$ along a span of said transmission system.

13. An apparatus as claimed in claim 12, further comprising means for measuring the power of said $s_{BP1}$, for determining the optical power of said $s_1$.

14. An apparatus for measuring the power of an optical signal $s_1$ travelling on a first channel $\lambda_1$ of a WDM transmission system between a transmit terminal and a receive terminal, comprising:

means for receiving a fraction of said optical signal $s_1$ with a signature bit pattern $s_{BP1}$ multiplexed into pre-selected time-slots of the frame of said optical signal $s_1$ and converting same into an electrical signal v;

means for separating said electrical signal v to separate a signature signal of a band comprising the frequency components of said signature bit pattern $s_{BP1}$; and an rms detector for measuring the root mean square value $rms_{SB1}$ value of said signature bit pattern $s_{BP1}$.

15. An apparatus as claimed in claim 14, wherein said means for receiving is arranged to be coupled at a point of interest along a span of said transmission system.

16. An apparatus as claimed in claim 15, wherein said means for receiving comprises a four port optical tap connected on said span at said point of interest for separating a fraction of said $s_1$.

* * * * *